Dec. 24, 1957     R. W. ANNESS     2,817,518
BLANK FEEDING APPARATUS
Filed Jan. 25, 1956     6 Sheets-Sheet 1

INVENTOR.
RUSSELL W. ANNESS
BY
Reuben J. Carlson
ATTORNEY

INVENTOR.
RUSSELL W. ANNESS
BY
Reuben J. Carlson
ATTORNEY

Dec. 24, 1957 R. W. ANNESS 2,817,518
BLANK FEEDING APPARATUS
Filed Jan. 25, 1956 6 Sheets-Sheet 3

INVENTOR.
RUSSELL W. ANNESS
BY
Reuben J. Carlson
ATTORNEY

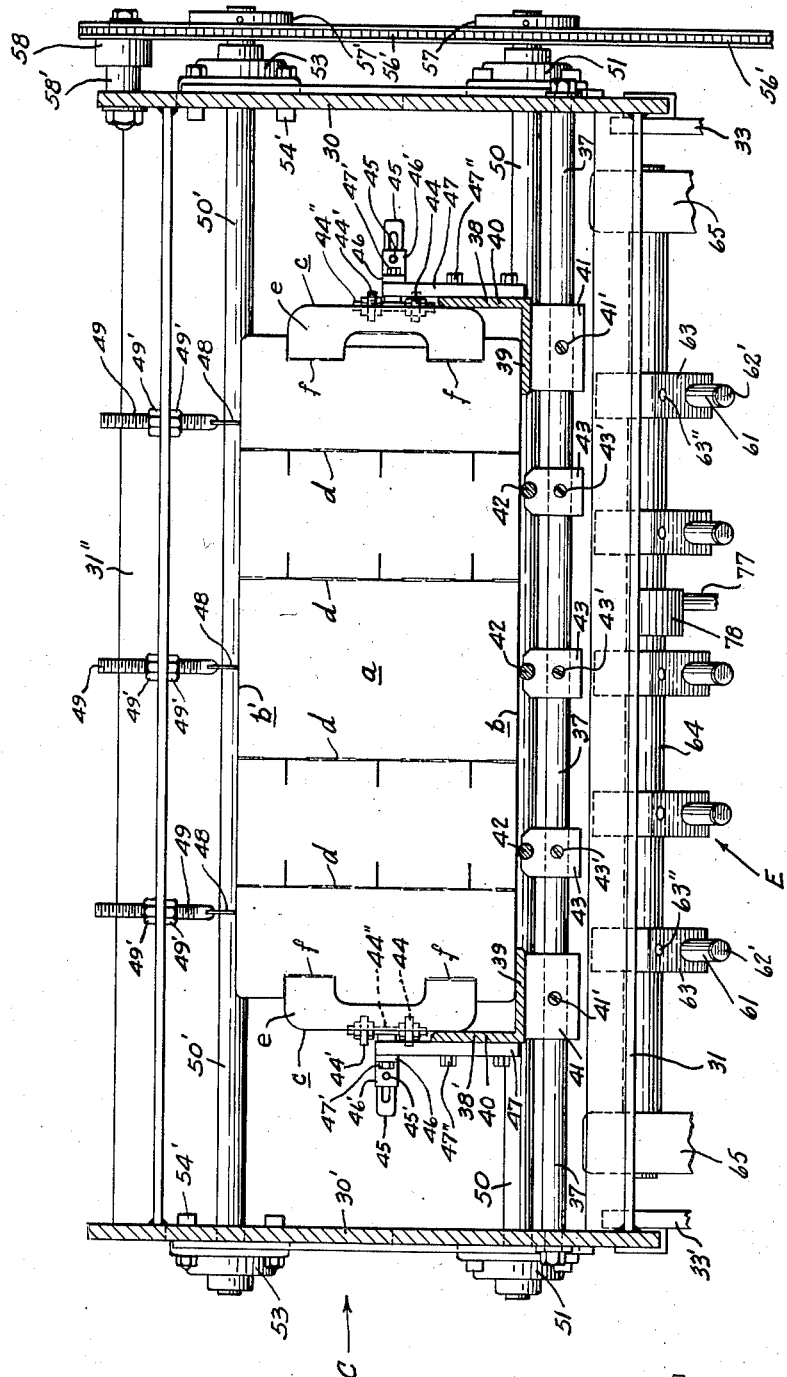

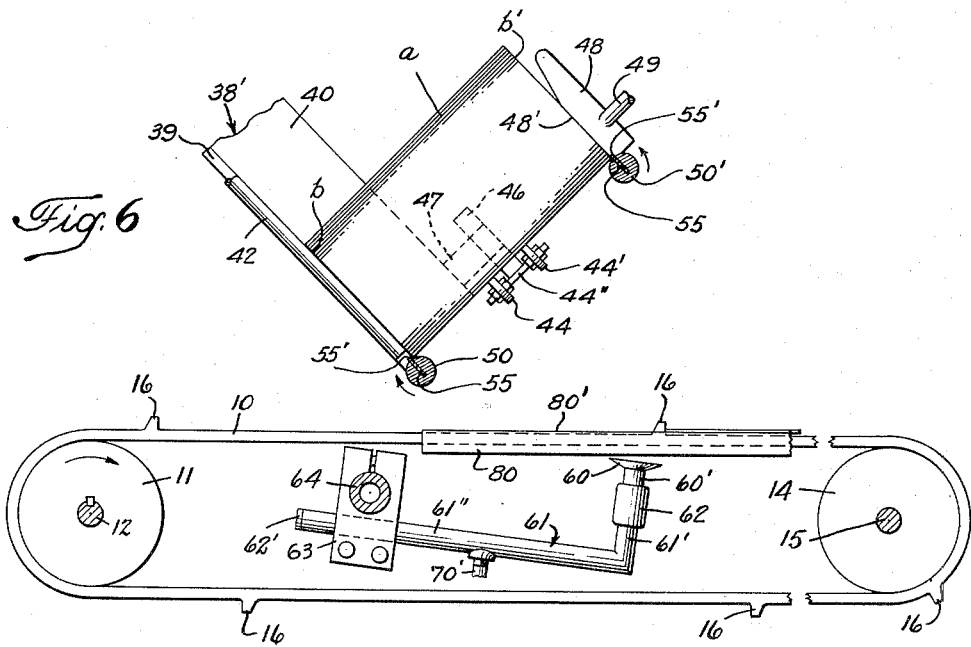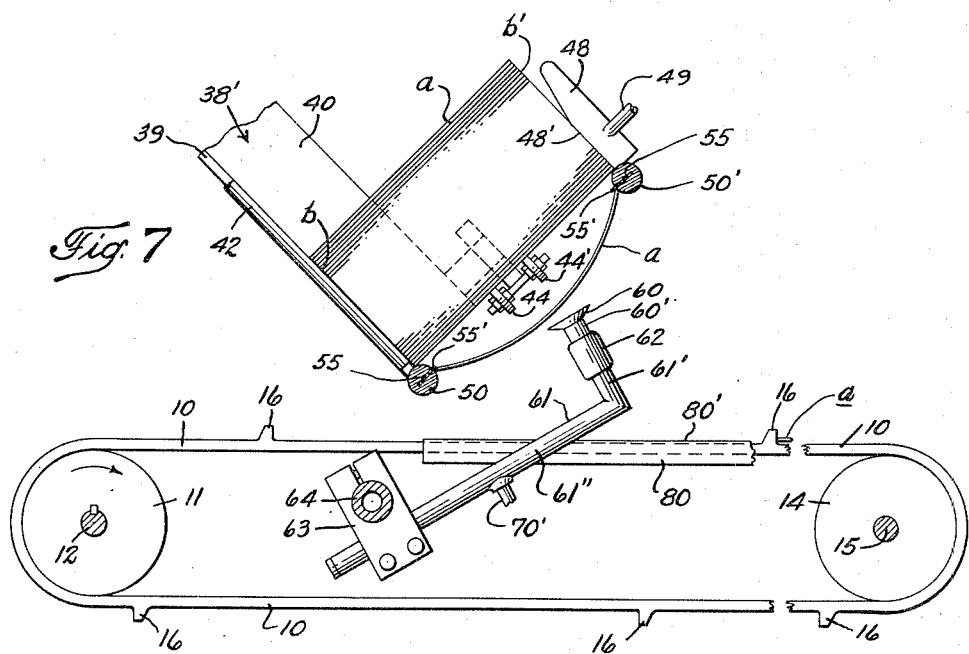

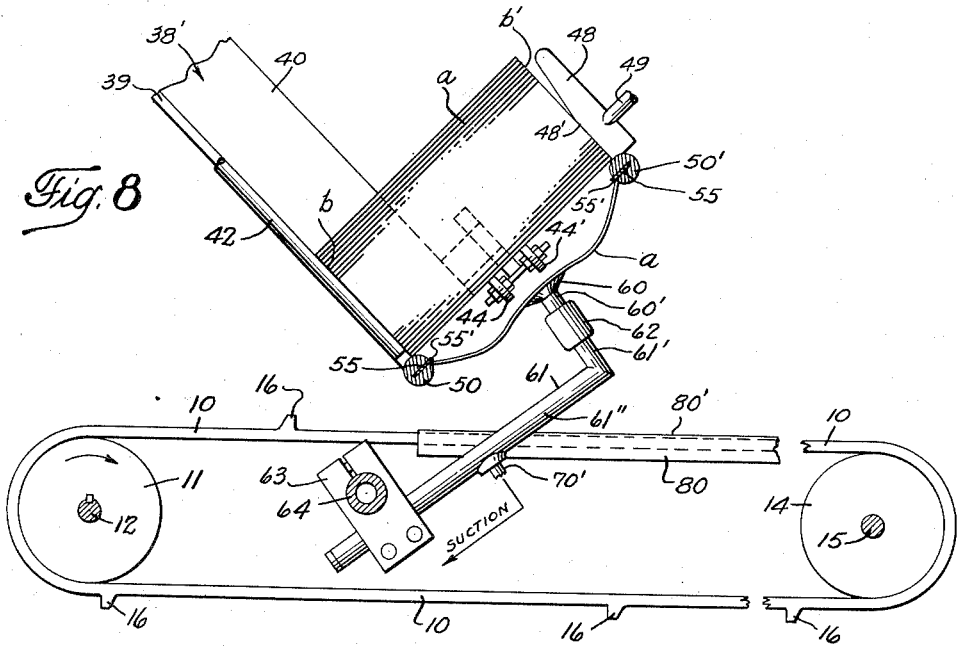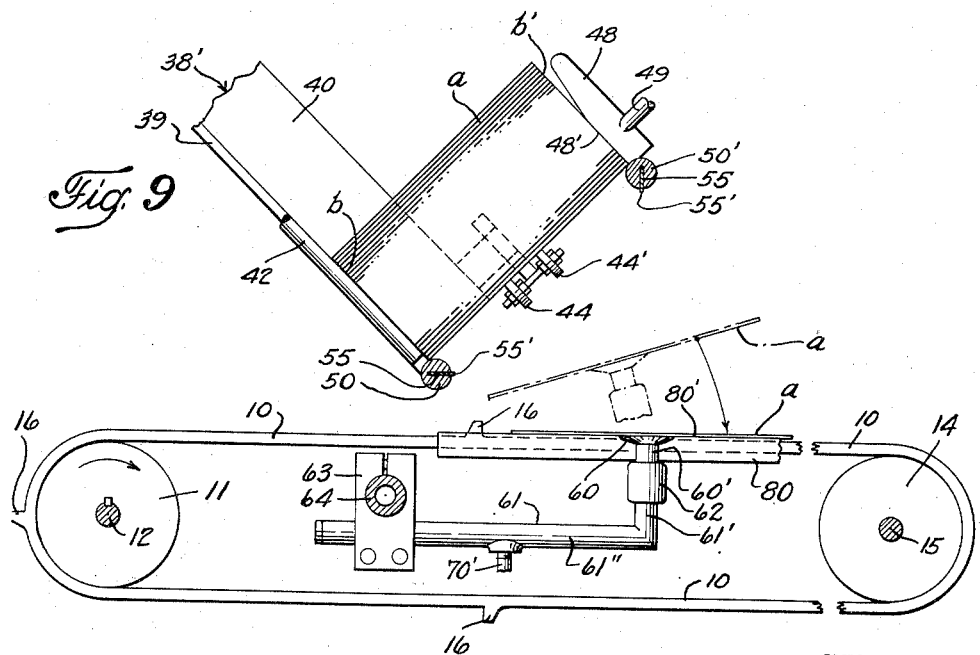

United States Patent Office 2,817,518
Patented Dec. 24, 1957

2,817,518

BLANK FEEDING APPARATUS

Russell W. Anness, Middletown, Ohio, assignor to The Gardner Board and Carton Co., Middletown, Ohio, a corporation of Ohio Application January 25, 1956, Serial No. 561,285

18 Claims. (Cl. 271—23)

This invention relates to blank feeding apparatus which embraces mechanism operative to successively separate the lead blank from the next adjacent blank of a blank stack, deposit the individual blanks in successive order on a blank conveyer, and arrange the successive blanks on the conveyer in the precisely spaced and aligned relationship as required for subsequent operations to be performed thereon.

Automatic machines designed to perform various folding, shaping, packaging or other operations on relatively flat blanks, usually operate most efficiently and effectively when the blanks are individually supplied thereto in uniformly spaced and aligned relation, in a continuous manner, and with uniform regularity. Failure of the blank feeding apparatus to supply single blanks in proper spaced and aligned relation, such as the feeding of two or more adhered blanks, or occasionally no blank, seriously interferes with the operating performance of the subsequent apparatus set up to perform special operations on the successive blanks.

By way of example, automatic machines designed to form and assemble cartons and containers from paperboard or fiberboard blanks, or to enwrap and enclose a blank around one or more merchandise items, are particularly dependent upon the proper feeding of successive single blanks in precisely spaced and aligned relationship, if the assembly machine is to accurately and efficiently perform its intended functions and operations. The problem of uniformly feeding separate blanks in a positive and uniform manner is rendered more difficult where the blanks are of considerable size, or of substantial length as compared to their width, or of variable flexibility resulting from previous scoring, or when the blanks are subjected to variable temperature, humidity or static conditions tending to cause adjacent blanks to adhere to one another; or vary in size or flexibility characteristics.

The blank feeding apparatus of this invention embraces a combination of improved features and mechanisms which cooperate to insure positive and uniform feeding of single blanks in precisely spaced and aligned relationship best suited for the subsequent operation to be performed thereon. The apparatus includes improved mechanism operative to positively separate successive individual blanks contained in a feed hopper, mechanism for depositing successive separated blanks in position for transportation on a conveyer, and mechanism for precisely spacing and aligning the successive blanks on the continuously traveling blank conveyer. The blank separating, blank depositing and blank registering mechanisms are driven from a single power source in operative synchronism to insure positive and uniform feeding of successive, separate and individual blanks in precisely spaced and aligned relationship to the location where the individual blanks are to be variously shaped and formed.

The blank hopper in which the blanks are stacked is tiltably mounted to support the lead blank in forwardly inclined position and in overhanging relation to the traveling conveyer. The blank separating mechanism is mounted on the feed hopper and operates to grip the lead blank only and to outbow the lead blank in a manner to positively separate the lead blank from the adjacent blank, irrespective of changes in temperature, humidity, static, or other operating conditions. The apparatus further includes suction devices forming a part of the blank depositing mechanism which are periodically oscillated in synchronism with the travel of the blank conveyer and the movement of the blank separating mechanism, to positively grasp the outbowed lead blank and deposit the same in position for transportation by the blank conveyer. The blank registering mechanism of the apparatus includes means and devices for both supporting and holding the deposited blank in relatively fixed position and until the next following pair of blank engaging lugs of the conveyer engage the bottom rear edge of the blank to advance the same forwardly in predetermined spaced relation to the preceding blank and the next following blank.

Means are provided which permit full adjustability of the various parts and mechanisms of the apparatus to effectively and positively feed various types and kinds of blank runs. For example, blank runs which vary in length, width and thickness may be successfully fed with this apparatus by making a few simple adjustments to the feed hopper and blank separating mechanism. Variable spacing of the deposited blanks may also be achieved as desired by adjusting the longitudinal spacing of the paired blank engaging lugs on the blank conveyer on which they are mounted.

Other objects and advantages of this invention will become apparent as the disclosure proceeds.

Although the characteristic features of this invention will be particularly pointed out in the claims, the invention itself, and the manner in which it may be carried out, may be better understood by referring to the following description taken in connection with the accompanying drawing forming a part hereof, in which:

Fig. 5 is a transverse section of the apparatus as viewed along line 5—5 of Fig. 1 and showing further details of the blank hopper and blank separating mechanism;

Figure 1:
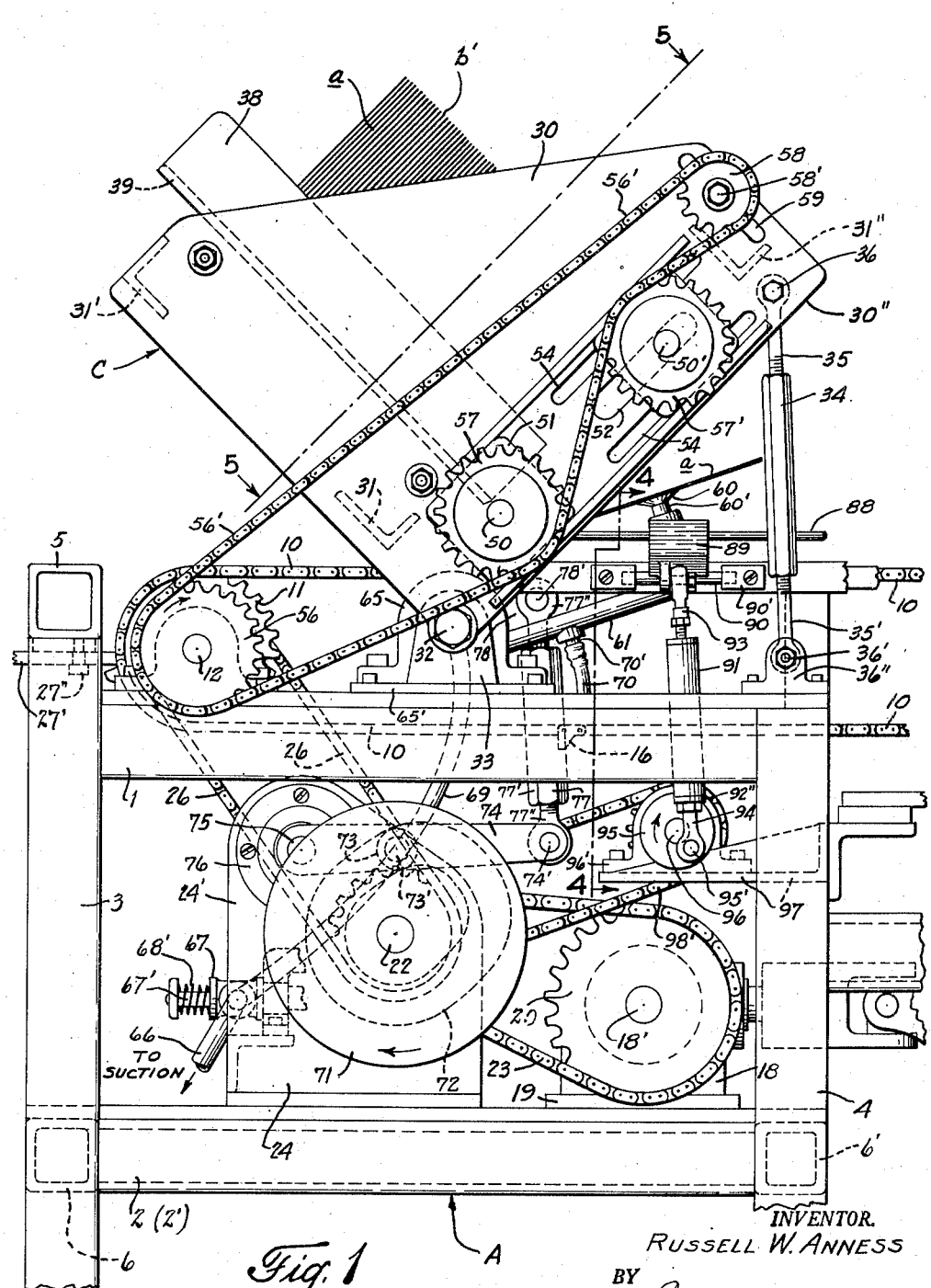
Fig. 1 is a side elevation of the blank feeding apparatus of this invention in operative association with one end of a blank conveyer.

Figs. 6, 7, 8 and 9 are diagrammatic views which illustrate the principles of operation of the apparatus of this invention and wherein: Fig. 6 shows the relative position of the blank engaging lugs on the conveyer and the downswung position of the suction arms when the rotating picker shafts are about to grip the bottom and top horizontal edges of the lead blank; Fig. 7 shows the relative position of the blank engaging lugs on the conveyer and the upswung position of the suction arms when the rotating picker shafts have outbowed the lead blank and separated the same from the following blank; Fig. 8 shows the relative position of the blank engaging lugs on the conveyer when the suction arms have been upswung into lead blank gripping position and the picker shafts are about to release the lead blank; and Fig. 9 shows the position of the blank engaging lugs on the conveyer the instant the lead blank has been deposited on the conveyer by the downswing movement of the suction arms, this view also showing in phantom lines the withdrawn lead blank in process of being carried down to conveyer deposited position by the suction arms.

Similar reference characters refer to similar parts throughout the several views of the drawings and specification.

As shown in the drawings, the blank feeding apparatus of this invention comprises suitable framework A which supports a continuously driven blank conveyer B which may be of any desired length to transport the blanks deposited thereon to the desired location. A blank supply hopper C is tiltably mounted on the supporting framework A and is so adjusted that the blanks, as vertically stacked therein, will incline forwardly, with the upper edge of the foremost or lead blank in overhanging relation to the upper run of the blank conveyer. Blank separating mechanism D, mounted on the feed hopper C and driven from the drive shaft of the conveyer, includes devices for outbowing the lead blank and thus effect separation thereof from the next adjacent blank. Blank depositing mechanism E, mounted within the framework, includes oscillating suction devices operative to be upswung into gripping engagement with the outbowed lead blank, and during the downswing movement thereof, to forcibly withdraw the lead blank from the hopper and deposit the same in position to be transported by the conveyer. Blank registering mechanism F is also provided, which includes devices for gripipng the deposited blank and maintaining the same in substantially the position it is initially deposited until positively engaged by the approaching blank advancing lugs fixed to the conveyer. Positive and precise spacing registry of the blanks transported by the conveyer is thereby assured.

While the apparatus of this invention may be adjusted to accurately feed blank runs of varying lengths, widths, thickness and flexible characteristics, the various parts and mechanisms of the apparatus disclosed in the accompanying drawings are shown adjusted to feed relatively long and narrow blanks which have been weakened by transverse scoring, to thus more fully illustrate the adaptability of this apparatus for feeding particularly difficult blanks. The blank *a* as shown in Fig. 5 of the drawings has been cut and scored to provide a wrapper blank designed to encase six flat topped cans, and presents parallel extending bottom and top edges *b—b'*, and parallel extending end edges *c*. The blank is provided with a series of transverse scores *d* which define the respective bottom, side and top panels of the carton to be formed therefrom, with handle parts *e* projecting from and hinged to the top panels by transverse score segments *f*.

Figure 2:
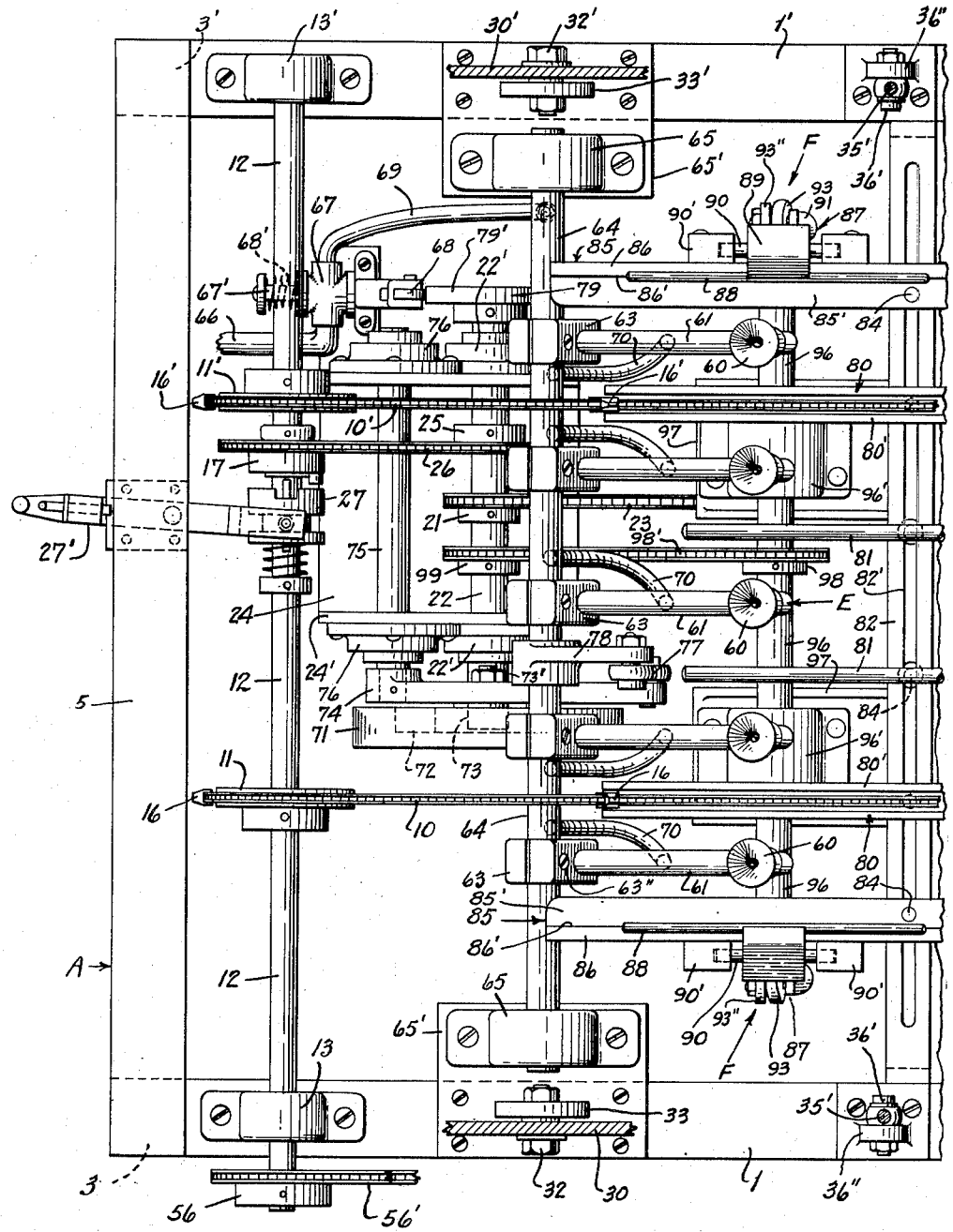
Fig. 2 is a plan view of the apparatus as it would appear when looking down on the blank conveyer, blank depositing mechanism, and blank registering mechanism, the blank hopper and associated blank separating mechanism not being shown in this view for reasons of clarity, except for a section of the lower corners of the hopper side walls.
Figure 3:
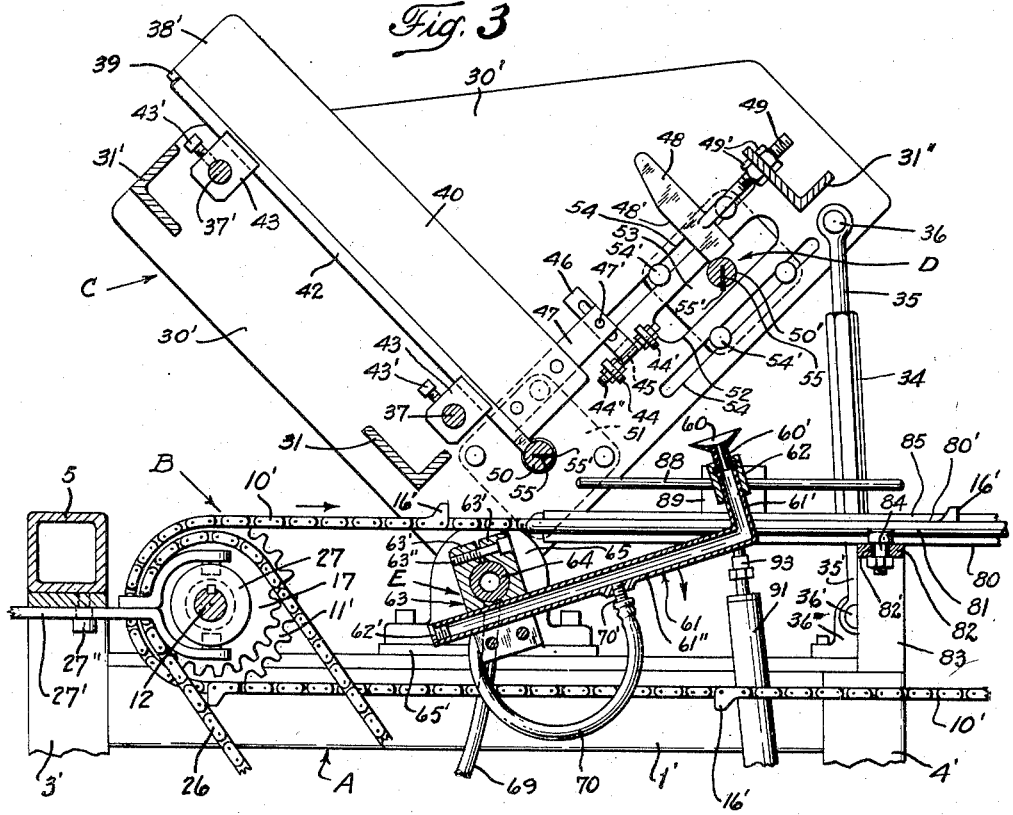
Fig. 3 is a longitudinal section showing further details of the blank hopper, blank conveyer, blank separating mechanism, blank depositing mechanism and blank registering mechanism.

The blank feeding apparatus of this invention is supported upon a suitable framework structure A at an elevation conforming to the equipment which is to perform subsequent blank folding and assembly operations. The framework structure A may include a pair of upper side frame members 1—1' and a pair of lower side frame members 2—2' secured to a pair of front supporting legs 3—3' and a pair of rear supporting legs 4—4', as shown in Figs. 1, 2 and 3. The upper ends of the front supporting legs 3—3' may be connected by a transverse head frame member 5 which is elevated slightly above the upper side frame members 1—1'. The paired front supporting legs 3—3' and the rear supporting legs 4—4' may be braced and stiffened by a pair of transverse lower frame members 6—6'.

The blank feed conveyer B, as shown in Figs. 1, 2, 3 and 8, may be variously constructed and formed in accordance with the blank size and stiffness characteristics, and in a form to accommodate subsequent blank forming operations. Where blanks *a* of considerable length, whose stiffness has been reduced by transverse scoring, are to be fed, the blank feed conveyer B may advantageously comprise a pair of continuous feed chains 10—10' which are trained around a pair of driving sprockets 11—11' fixed to a supporting shaft 12 rotatably supported in bearing blocks 13—13' fixed to the upper side frame members 1—1' adjacent the head frame member 5. The spaced conveyer chains 10—10' extend in parallel relation and are sufficiently spaced to provide transverse support for the blanks *a* as successively deposited on the upper runs thereof by the blank depositing mechanism E.

The discharge end of the conveyer chains 10—10' are trained around a pair of rear supporting sprockets 14 fixed to a freely rotatable shaft 15 which is only diagrammatically illustrated in Figs. 6, 7, 8 and 9. The paired blank feeding chains 10—10' may obviously be made in any length sufficient to convey the successive blanks to the desired location. The conveyer chains 10—10' carry a series of adjustable blank engaging lugs 16—16' which are arranged to travel in transverse alignment and are designed to successively engage the rear edge of the successive blanks as deposited on the conveyer chains 10—10' by the blank depositing mechanism E. As shown in Figs. 9 and 10, the transversely aligned blank engaging lugs 16—16' are spaced apart a distance which is substantially greater than the width of a single blank, so that each blank may be deposited between adjacent pairs of lugs, with the following pair of lugs 16—16' approaching the rear edge of the blank as shown in Fig. 9.

The conveyer chain driving shaft 12 carries a driving sprocket 17 which idles thereon but may be connected thereto by a clutch 27 fixed to the shaft 12 and thus driven from the main driving gear assembly or driving motor 18 as shown in Figs. 1, 2 and 3. The main driving motor 18 drives the sprocket 17 continuously, but the blank conveyer shaft 12 may be thrown into and out of operation by manipulating the clutch lever 27' which is pivotally mounted as by stud 27" to the underside of the head frame member 5 as shown in Figs. 1 and 2.

The driving motor 18 may be supported on a suitable bed platform 19 which rests on and is fixed to the lower transverse frame members 6—6'. The shaft 18' of the motor 18 may have a driving sprocket 20 fixed thereto which in turn drives a sprocket 21 fixed to the main drive shaft 22 through a driving chain 23. The main drive shaft 22 is rotatably supported in journals 22' fixed to the spaced upwardly projecting flanges 24' of a supporting bracket 24 which may also be secured to the lower bed platform 19. The main drive shaft 22 also provides the drive for other devices associated with the blank depositing mechanism E and blank registering mechanism F as will hereafter be explained. The main drive shaft 22 has a driven sprocket 25 fixed thereto which in turn drives the clutch sprocket 17 on the conveyor driving shaft 12 through drive chain 26. It will be appreciated that the sprockets 17, 20, 21 and 25 are of such diameter as to establish the proper driving ratio between the motor 18 and the conveyer driving shaft 12 so that the chain conveyers 10—10' are driven in proper speed relation to the blank depositing mechanism E and blank registering mechanism F.

*The blank hopper*

The blank hopper C may be formed by a pair of generally triangular shaped side wall plates 30—30' which may be spaced transversely of the framework for substantially the full width thereof as shown in Figs. 1, 2, 3 and 5. The side wall plates 30—30' are rigidly connected by a pair of transversely extending frame bars 31—31' which may be of angular shape to thereby provide a strong hopper construction. The blank hopper is further reinforced by an upper stiffening bar 31" of angular cross section which is positioned above the frame bar 31 and secured as by welds to the side wall plates 30—30' of the hopper. The hopper is tiltably supported to permit adjustment of the front edges 30" of the side wall plates 30—30' to any desired acute angle with respect to the forward travel of the conveyer chains 10—10', on a pair of sturdy pivot studs 32—32' as shown in Figs. 1 and 2 which extend through the lower corners of the hopper side plates 30—30' and are supported in a pair of brackets 33—33' which may be fixed to and supported by the upper side frame members 1—1', as shown in Figs. 1, 2 and 3.

Tilting adjustment of the blank hopper may be effected by a pair of turnbuckles 34, each having a pair of stud rods 35—35' threaded into the opposite ends thereof as shown in Figs. 1, 2 and 3. The upper terminal end of each upper stud rod 35 is pivotally supported by a hinge pin 36 fixed to the front upper corner of the adjacent hopper side wall plate 30—30'. The lower terminal end of each lower stud rod 35' is pivotally supported by a hinge pin 36' extending from a hinge pin bracket 36'' which may be fixed to and supported by the adjacent upper side frame member 1—1'.

The lower edges b of the stacked blanks are supported within the hopper by a pair of sturdy transversely extending support rods 37—37' whose ends are secured to the adjacent side wall plates 30—30' of the hopper as shown in Figs. 1, 3 and 5. The transverse support rods 37—37' are substantially equally spaced from the rear lower edge of the side wall plates 30—30', with the rear support rod 37' at a higher elevation than the front support rod 37. The lower edges b of the blanks a as stacked within the hopper are supported in stacked relation on a pair of main slide members 38—38' and a series of intermediate slide rods 42 which are supported in longitudinally inclined relation by the support rods 37—37'.

Each of the longitudinally inclined slide members 38—38' may be angular in form to present a horizontally extending blank supporting flange 39 on which the lower edges b of the stacked blanks rest as shown in Fig. 5. Each slide member 38—38' is made transversely adjustable on the support rods 37—37' by means of a pair of lower and upper slide brackets 41, each bracket 41 being fixed to the horizontal flange 39 of the slide member 38—38' and embraces the adjacent support rod 37—37' which extends therethrough. Each slide member 38—38' may be held in any desired transversely adjusted position by a set screw 41' which extends through each of its slide brackets 41 and is manipulatable to grip the support rod on which it is mounted. Thus, by a suitable transverse adjustment of the blank supporting slide members 38, any desired blank lengths may be supported by the blank supporting flanges 39 thereof, with the verticle guide flanges 40 thereof serving to maintain the ends c of the stacked blanks in true alignment.

The intermediate extending slide rods 42 may be adjustably spaced in transverse relation to provide adequate support for the intermediate portions of the stacked blanks. As shown in Figs. 3 and 5, each slide rod 42 is adjustably supported from the front and rear support rods 37—37' by adjustable front and rear slide brackets 43 through which the front and rear support rods 37—37' extend. Each slide rod 42 is held in any desired transversely adjusted position by a set screw 43' as shown in Fig. 5, which is threaded into each slide bracket 43 in a manner to grip the support rod 37—37' on which it is mounted.

It will be noted by referring to Fig. 1 that the stacked blanks a are designed to incline forwardly so that the lead blank to be first withdrawn is inclined forwardly in overhanging relation to the upper run of the blank conveyer chains 10—10'. Means are provided to support each of the end edges c of the lead blank and retain the same within the hopper until forcibly withdrawn therefrom by the blank depositing mechanism E. As shown in Figs. 3, 5, 6 and 7 the means for releasably retaining the lead blank comprises a pair of small retaining rollers 44—44' positioned at each end edge of the blank and which are freely rotatable on a pin shaft 44'' which is adjustably supported to the desired forward inclination of the lead blank. The adjustable support for each pin shaft 44'' may comprise an adjustable metal strip 45 which is adjustably secured as by an adjusting bolt 45' to the angular leg 46' of a bracket 46. The bracket 46 is in turn adjustably secured to a bracket plate 47 as by adjusting bolts 47', the bracket plate 47 being in turn secured as by bolts 47'' to the vertical guide flange 40 of the adjacent blank supporting slide member 38—38'. The paired retainer rollers 44—44' at each end edge c of the lead blank may thus be adjusted as required to partially overlap the adjacent end edge c of the blank as shown in Fig. 5, and thus retain the lead blank in the desired forwardly inclined relation to the blank conveyer chains 10—10' therebelow.

Means are also provided for retaining the top horizontal edge b' of the blank stack in true alignment and properly seated on the blank supporting flanges 39 of the main slide members 38—38' and upon the intermediate blank supporting slide rods 42. As shown in Figs. 3, 5, 6 and 7, the means for maintaining the top edges b' in alignment may comprise a series of aligning blades 48 each of which is secured to the lower end of a threaded adjusting pin 49. Each adjusting pin 49 extends through the flange of the upper angle shaped hopper stiffening bar 31'' and is adjustably clamped thereto as by a pair of adjusting nuts 49'. By a suitable adjustment of the nuts 49', the lower edge 48' of each blank aligning blade 48 may be adjusted to lightly contact the top horizontal edge b' of the stacked blanks a and thus maintain the same in alignment as shown in Figs. 6 and 7.

*Blank separating mechanism*

The blank separating mechanism D includes devices for positively separating and outbowing the lead blank from the next adjacent blank of the blank stack. The lead blank outbowing devices operate in synchronism with blank depositing mechanism E which includes devices which positively grip the outbowed lead blank, withdraws the lead blank from its retained position as held by the paired retainer rollers 44—44', and deposits the withdrawn blank in transporting position on blank conveyor chains 10—10'. The devices for outbowing the lead blank include a pair of transversely extending upper and lower picker shafts 50'—50, as shown in Figs. 1, 3, 5, 7, 8, 9 and 10, which are adjustably positioned adjacent the lower and upper horizontal edges b—b' of the lead blank and thus normally also serve to assist the retainer rollers 44—44' in holding the lead blank in stacked position.

The lowermost picker shaft 50 is journaled in a pair of fixed bearing blocks 51 mounted on the outside face of the side wall plates 30—30' of the blank hopper. The lower picker shaft 50 is positioned directly adjacent to the blank discharge end of the blank supporting flange 39 of the main blank supporting slide members 38—38'. Each end of the upper picker shaft 50' extends through an elongated slot 52 formed in each of the hopper sidewall plates 30—30' and is journaled in a pair of bearing blocks 53 which are adjustably mounted on the outside face of the hopper sidewall plates 30—30'. Sliding adjustment of the upper bearing blocks 53 is effected by the provision of a pair of spaced and parallel extending slots 54 formed in each of the hopper side wall plates 30—30' and through which two or more adjusting bolts 54' extend. By suitable adjustment of the adjusting bolts 54', the bearing blocks 53 may be vertically adjusted as desired to place the upper picker shaft 50' supported thereby directly adjacent the horizontal upper edge b' of the lead blank a.

The picker shafts 50—50', as shown in Figs. 6, 7, 8 and 9, each present a series of spaced picker blades 55 adjustably set therein so that the exposed edge 55' of each picker blade projects beyond the circumference of the picker shaft 50—50' in which it is mounted for a distance not substantially greater than the thickness of the blanks to be fed, but perferably greater than one-half the thickness of the blanks to be fed. As shown in Figs. 6, 7, 8 and 9, the upper picker shaft 50' is rotated counter-clockwise while the lower picker shaft 50 is rotated clockwise. Rotation of the lower and upper picker shafts 50—50' is so synchronized that the exposed edges 55' of the picker blades 55 mounted therein will substantially simultaneously engage the bottom and top horizontal edges b—b' of the lead blank when the picker shafts 50—50' are rotated as shown in Fig. 6. During continued synchronized rotation of the picker shafts 50—50', the exposed edges 55' of the blades 55 will grip the bottom and top horizontal edges b—b' of the lead blank and outbow the lead blank as shown in Figs. 7 and 8 and finally kick out the lead blank from supported relation to the picker shafts 50—50' as shown in Fig. 9. The circumferential surfaces of the picker shafts 50—50' retain the next following blank in position.

The lower and upper picket shafts 50—50' are driven from the conveyer drive shaft 12 and thus rotate in synchronism with the advance movement of the upper run of the blank conveyer chains 10—10'. One of the outer ends of the conveyer drive shaft 12 has a sprocket 56 secured thereto, as shown in Figs. 1, 2 and 5, and around which a sprocket chain 56' is trained. The adjacent projecting ends of the picker shafts 50—50' each have a sprocket 57 and 57' respectively secured thereto and around which one run of the sprocket chain 56' is trained in a manner to drive the lower picker shaft 50 clockwise and the upper picker shaft 50' counterclockwise as shown in Fig. 1. An idler sprocket 58 is rotatably mounted on a stud shaft 58' which extends through an adjusting slot formed in the adjacent hopper side wall plate 30 so that the position of the idler sprocket 58 may be adjusted as desired to maintain the drive chain 56' trained thereon in relatively taut condition.

Rotation of the conveyer drive shaft 12 operates to rotate the picker shafts 50—50' through a complete revolution during travel of the upper run of the blank conveyer chains 10—10' for a distance equal to the longitudinal spacing of the aligned blank engaging lugs 16—16' thereon. It will be appreciated that the picker shaft driving sprockets 57—57' have a diametric ratio with respect to the diameter of the driving sprocket 56 fixed to the conveyer drive shaft 12 to insure this result.

*Blank depositing mechanism*

The blank depositing mechanism E includes suction devices for positively gripping the outbowed lead blank, withdrawing the lead blank completely from the blank stack, and positively depositing the same in transporting position on the blank conveyer chains 10—10'. The suction devices include a series of suction cups 60 which are mounted to be swung an angular distance of approximately 45°, as shown in Figs. 6 and 8. Each suction cup 60 may be made of relatively soft natural or synthetic rubber composition and has a compressible neck portion 60'. The compressible neck portion 60' of each suction cup 60 is secured to the fore arm section 61' of a tubular rocker arm 61 as by a coupling 62. The fore arm section 61' of the tubular rocker arm 61 extends substantially at right angles to the main arm section 61" thereof and has its rear end closed by a screw plug 62'.

Each rocker arm 61 is supported by a clamp block 63 which is attached to the main arm section 61" thereof. Each clamp block 63 comprises a pair of clamp block sections 63' which are adjustably clamped as by clamp bolt 63" to a tubular rocker shaft 64. The tubular rocker shaft 64, as shown in Figs. 1, 2 and 5, is rockably supported in a pair of bearing blocks 65 which may be mounted on bracket plates 65' extending from and secured to the adjacent upper side frame members 1—1'. The rocker tube 64 is supplied with suction from a main supply line 66 connected to an automatic control valve 67 which in turn is connected to a flexible tube 69 which is connected to the tubular rocker shaft 64. The rocker shaft 64 has closed ends and supplies suction to each tubular rocker arm 61 by means of a flexible tube 70, one end of which is connected to the rocker shaft 64 and the other end thereof connected as by nipple 70' to the main arm section 61" of the tubular rocker arm 61 as shown in Fig. 3.

Any desired number of suction cups 60 and associated rocker arms 61 may be provided to insure the most effective gripping action on the lead blank to be withdrawn. The suction cups 60 and associated rocker arms 61 may be adjusted in any desired spaced relation on the tubular rocker shaft 64 by means of the adjustable clamp blocks 63 which support the rocker arms 61. The rocker shaft 64 is oscillated in timed relation to the speed of advance travel of the upper run of the blank conveyer chains 10—10' through an angle of approximately 45°, or from the at-rest position indicated in Fig. 6 to the maximum upswung position indicated in Fig. 8.

The suction rocker arms 61 and rocker shaft 64 are rapidly rocked to and from the downswung position shown in Fig. 6 to the maximum raised position shown in Fig. 8 by cam devices operatively connected to the continuously driven main drive shaft 22. As shown in Figs. 1 and 2, a cam wheel 71 fixed to the projecting end of the main drive shaft 22, has a generally eliptical shaped cam groove 72 formed therein. The cam groove 72 is designed to receive a cam roller 73 rotatably mounted on a stud pin 73' projecting laterally from the approximate midsection of a rocker bar 74. One end of the rocker bar 74 is fixed to the projecting end of a secondary shaft 75 which is rockably mounted in a pair of bearing blocks 76 fixed to the adjacent upright flanges 24' of the main drive shaft supporting bracket 24.

The opposite end of the rocker bar 74 is connected by an adjustable connecting member 77 to the crank arm 78 of the tubular rocker shaft 64 as shown in Figs. 1 and 2. The connecting member 77 comprises a turnbuckle 77' having an eye bolt 77" threaded into each end thereof. One of the eye bolts 77" is pivotally connected to a stud pin 74' projecting from the oscillating end of the rocker bar 74 and the other eye bolt 77" is pivotally connected to a stud pin 78' projecting from the crank arm 78.

The cam groove 72 in the cam wheel 71 is so shaped as to rapidly oscillate the suction rocker arms 61 through the angular distance indicated in Figs. 6 and 8 during each complete revolution of the cam wheel 71. Between each relatively rapid rocking movement, the suction rocker arms 61 and associated suction cups 60 remain at rest below the upper run on the blank conveyer chains 10—10' during the advance passage of a deposited blank thereover. However, as soon as the aligned blank engaging lug 16—16' against which the rear edge of the advancing blank abuts, has passed beyond the path of swing of the suction cups 60, the cup supporting rocker arms 61 are swung rapidly upward as shown in Fig. 7 and the suction cups 60 pressed into firm suction engagement with the bowed lead blank as shown in Fig. 8. At maximum upswing, the suction cups 60 are firmly pressed against the outbowed lead blank sufficiently to deform the lead blank into a flat S-shaped configuration as shown in Fig. 8 to thereby positively assure a firm grip of the suction cups on the midsection of the outbowed lead blank and a tight suction seal therebeween. The resilient compressible neck portions 60' of the flexible suction cups 60 further assure a firm suction seal between the suction cups 60 and the outbuckled lead blank.

When the following pair of aligned blank engaging lugs 16—16' have arrived to a position approximately vertically below the lower picker shaft 50, the rocker arms 61 and associated suction cups 60 will swing rapidly downward and deposit the blank flatly over the blank conveyer chains 10—10' immediately in advance of the following blank engaging lugs 16—16' as shown in Fig. 9.

The swinging movement of the rocker arms 61 and associated suction cups 60 takes place between the rear edge of the adjacent deposited blank and its blank engaging lugs 16—16' and the immediately following lugs 16—16'; so that the rocker arms 61 in no way interfere with the advance movement of the deposited blanks.

The elliptical cam groove 72 is so shaped as to retain the suction cups 60 and associated rocker arms 61 in residence below the path of travel of the deposited blank until its rear edge has passed the path of swing of the suction cups 60. Thereupon, the rocker arms 61 and suction cups 60 are swung rapidly upward and remain at substantially maximum upswung position for a time sufficient to insure a firm suction grip of the suction cups 60 against the bowed lead blank. The cam groove 72 and cooperating rocker bar 74 then operate to swing the rocker arms 61 rapidly downward below the path of travel of the upper run of the blank conveyer chains 10—10' and thus deposit the suction cup supported blank over that section of the conveyer chains 10—10' which is immediately in advance of the following blank engaging lugs 16—16'.

Suction supply to the suction cups 60 is controlled by the automatic control valve 67 so that suction force is applied to the suction cups 60 at the moment of initial contact with the outbuckled lead blank and the suction force maintained during withdrawal of the lead blank and downswing movement of the lead blank until deposited over the conveyer chains 10—10' therebelow. The suction force is then instantaneously cut off, and remains cut off during residence of the rocker arms 61 below the upper run of the conveyer chains 10—10', and during upswing movement thereof to lead blank contacting position.

Means are provided for automatically manipulating the control valve 67 in accordance with the cycle of movement of the rocker arms 61 as above explained. The automatic means for operating the control valve 67 comprises a cam disc 79 which is fixed to the adjacent end of the main drive shaft 22 and rotates therewith as shown in Figs. 1 and 2. A cam roller 68 is rotatably mounted on the valve manipulating stem section 67' of the control valve 67 and is maintained in pressure rolling contact with the camming periphery 79' of the cam disc 79 by a spring 68' forming a part of the control valve 67. The camming periphery 79' of the cam disc 79 is shaped to so manipulate the control valve 67 that it will regulate the suction supply through the tube 69, the tubular rocker shaft 64, the flexible tubes 70 and the tubular rocker arms 61 so that suction force is applied to the suction cups 60 only when in contact with the outbowed lead blank and during downswing movement thereof, with the suction force cut off an instant before the rocker arms 61 reach maximum downswung position and during upswing travel thereof.

Blank registering mechanism

To facilitate subsequent forming operations, it is usually important that the blanks be transported by the conveyer in uniform spaced relation and with the end edges c thereof in alignment. The blank feeding apparatus of this invention includes registering mechanism F for aligning the ends of the successively deposited blanks and uniformly spacing the successive blanks with the rear edge b of each blank in abutting registry with the following pair of aligned blank advancing lugs 16—16'.

Figure 4:
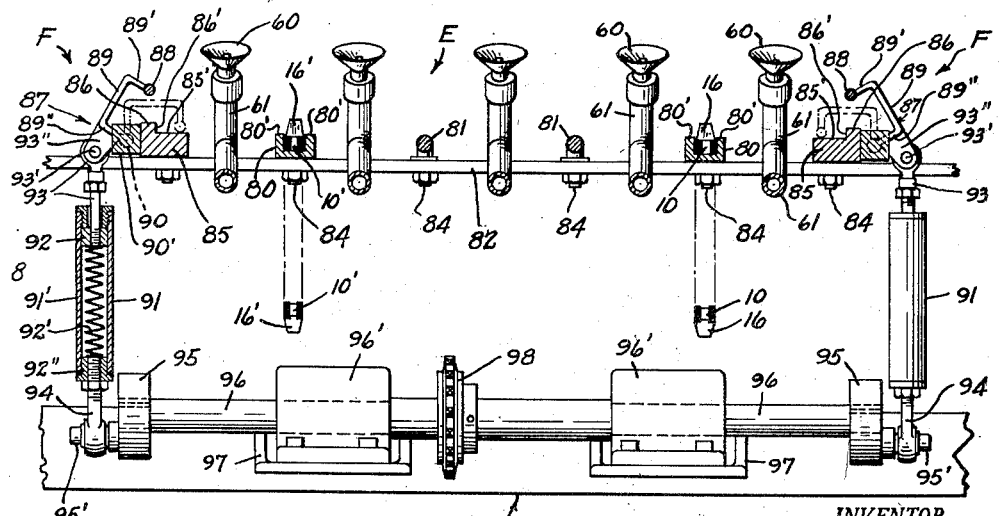
Fig. 4 is a fragmentary transverse sectional view showing further details of the blank registering mechanism as the same would appear when viewed along line 4—4 of Fig. 1.

The registering mechanism includes a pair of blank stripper channels 80 which extend from the approximate vicinity of the lower picker shaft 50 of the blank hopper and for a distance forwardly thereof as shown in Figs. 2, 3 and 4. The conveyer chains 10—10' travel within the stripper channels 80 and are partly supported thereby at a fixed elevation. The stripper channels 80 present smooth blank sliding surfaces 80' which provides sliding support for the deposited blank, with only the blank advancing lugs 16—16' extending above the blank sliding surfaces 80' thereof.

A series of intermediate blank stripper rods 81, as shown in Figs. 2, 3 and 4, may also be provided to additionally support and strip the deposited blank from the suction cups 60. The upper surfaces of the stripper rods 81 are co-planar with the blank sliding surfaces 80' of the stripper channels 80 as shown in Fig. 4. The stripper channels 80 and the stripper rods 81 may be adjustably supported by a transverse support bar 82 which may in turn be supported by suitable brackets 83 fixed to the framework as shown in Figs. 1, 2 and 3. The transverse support bar 82 may have an adjusting slot 82' extending substantially the full length thereof and which is designed to receive clamp bolts 84 by which the stripper channels 80 and stripper rods 81 are adjustably secured in the desired transversely spaced relation.

A pair of blank guiding bars 85 also extend in parallel relation adjacent the path of travel of the end edges c of the blanks and may also be supported by and adjustably secured to the transverse support bar 82 as by clamp bolts 84. As shown in Figs. 1, 2 and 4, each of the blank guiding bars 85 present a smooth top face 85' which is substantially co-planar with the slide surfaces 80' of the blank stripper channels 80 and thus provide a smooth surface along which the ends of the blank may slide. The blank ends are guided during their advance travel by the vertical faces 86' of rib formations 86 which extend longitudinally of the blank guiding bars 85 and project upwardly from the adjacent slide surfaces 85' thereof. The vertical faces 86' of the guide ribs 86 thus serve to maintain the adjacent end edges c of the successively deposited blanks in longitudinal alignment during forward travel thereof.

It will be noted by referring to Fig. 9, that the blank a, immediately after its deposition on the stripper channels 80 and the stripper rods 81, will present its rear or bottom edge b spaced somewhat forwardly of the adjacent pair of advancing lugs 16—16'. The distance between the rear edge of the blank as initially deposited and the adjacent advancing lugs 16—16' may vary in accordance with the oscillating cycle of the suction cup rocker arms 61. To insure accurate spacing registration of the successive blanks, the registering mechanism of this invention includes a pair of blank clamping devices 87 which momentarily holds each blank in the position in which it is initially deposited by the suction cups 60, and until the next following advancing lugs 16—16' have arrived to positively engage the rear bottom edge b of the blank.

The blank clamping devices 87 comprise a pair of blank hold-down rods 88 each fixed to the inner leg 89' of a U-shaped yoke 89 whose outer leg 89'' is swingably hinged on a hinge pin 90 whose ends are supported by bearing elements 90' fixed to the adjacent outside face of the adjacent blank guide bar 85, as shown in Figs. 1, 2 and 3. The yokes 89 are swingably oscillated in timed relation to the initial deposition of the successive blanks over the conveyer chains 10—10'. Thus, immediately upon the deposition of the blank to rest position on the stripper channels 80 and stripper rods 81, the clamp rods 88 are swung downwardly so as to hold the adjacent ends of the blank against the smooth top surface 85' or the blank guide bars 85, as indicated in the dot and dash lines at the left hand side of Fig. 4. However, when the next pair of approaching blank advancing lugs 16—16' have advanced into abutting relation against the bottom rear edge b of the deposited blank, the yoke members 89 are tilted upwardly as shown in Fig. 4 and the clamp bars 88 thereof swung to a position where they will not interfere with the advance movement of the lug engaged blank, or the deposition of the following blank upon the stripper channels 80 and guide bars 85. However, the moment the following blank has been deposited, the clamp rods 88 are again swung downwardly into blank clamping position.

The yokes 89 and associated clamp rods 88 are swingably manipulated in the manner above described by a pair of reciprocable manipulator members 91 as shown in Figs. 1, 2 and 4. Each manipulator member 91 is pivotally connected at one end thereof to the yoke 89 and at the other end thereof to a stud pin 95' of a crank disc 95. The two crank discs 95 are fixed to the opposite ends of a shaft 96 which is journaled in pillow blocks 96' fixedly secured and supported by a shelf bracket 97 suitably fixed to the framework. The shaft 96 has a sprocket 98 fixed thereto and which is driven by a drive chain 98' which is trained around a driving sprocket 99 fixed to the main drive shaft 22. The clamp rods 88 are thus swingably manipulated to and from blank clamping position during each rotation of the crank disc shaft 96 as rotated from the main drive shaft 22.

To permit sensitive adjustment of the rocking movement of the blank clamping rods 88 and associated yokes 89, each manipulating member 91 may comprise a tubular body 91' as shown in Fig. 4 whose end receives a slidable plug 92. A compression spring 92' as shown in Fig. 4 urges the plug 92 towards the upper end of tubular body 91'. An eye bolt 93 is adjustably secured to the adjacent end plug 92 and has the eye portion thereof hinged to a pin 93' which is supported by ear portions 93'' extending laterally from the rear leg 89'' of the yoke 89. Another plug 92'' at the lower end of the connecting tube 91' also has an eye bolt 94 threaded thereto and whose eye portion receives the stud pin 95' of the adjacent crank disc 95. Thus, a resiliently adjustable connection is provided between the stud pins 95' of the crank discs 95 and the yokes 89 which permits the application of resilient clamping pressure to the end edge of the blank the instant it is deposited on the blank guide bars 85.

*Operation*

The blanks to be fed are stacked within the blank hopper C, after proper adjustment of the slide members 38—38' to accommodate the ends of the blanks stacked between the guide flanges 40 thereof. The aligning blades 48 are also adjusted to maintain the upper horizontal edges $b'$ of the blanks in proper alignment. The retainer rollers 44—44' are also adjusted as necessary to properly support the ends of the lead blank. The bearing blocks 53 are also adjusted so that the upper picker shaft 50' supported thereby is in abutting relation to the upper horizontal edge $b'$ of the lead blank as shown in Fig. 6.

The driving motor 18 is then placed in operation, and the clutch 27 manipulated to drive the blank conveyer chains 10—10' and the picker shafts 50—50' through the picker shaft chain 56'. With each rotation of the picker shafts 50—50', the projecting edges 55' of the picker blades 55 thereof will simultaneously grip the bottom and top horizontal edges $b$—$b'$ of the lead blank as shown in Fig. 8 and cause it to outbow as shown in Fig. 7. The suction rocker arms 61 will then be activated and swung upwardly as shown in Fig. 7. When the maximum upswing position is reached as shown in Fig. 8, the suction cups 60 thereof will be firmly pressed against the midsection of the lead blank while still held by the end retainer rollers 44—44' and the lower and upper picker shafts 50—50'. The flat S rebend of the lead blank as shown in Fig. 8 positively assures complete separation thereof from the following blank.

At the moment of contact of the suction cups 50 with the lead blank, the automatic control valve 67 operates to supply suction to the suction cups 60. Simultaneously with the downswing movement of the suction arms 61, the upper and lower edges of the lead blank are kicked loose from the picker shafts 50—50' and are withdrawn from supported position from the retainer rollers 44—44'. The blank will then be fully supported by the suction cups 60 as shown by the phantom lines of Fig. 9. As the blank is carried downwardly it is stripped from the suction cups 60 when deposited on the smooth surfaces of the stripper channels 80, stripper rods 81 and blank guide bars 85. The automatic control valve 67 then operates to cut off the suction from the suction cups 60 and the suction arms 61 remain inoperative until the deposited blank has advanced out of the path of upswing movement of the suction arms 61.

The moment that the blank is deposited upon the stripper channels 80 and stripper rods 81, the yokes 89 are activated so as to swing the clamp rods 88 thereof into pressing contact with the adjacent ends of the deposited blank, and the deposited blank is thereby held until the next following blank advancing lugs 16—16' have engaged the rear edge $b$ of the blank and squared the blank in aligned position between the guide faces 86' of the guide ribs 86. The blank then slides along the smooth surfaces of the stripping channels 80 and stripping rods 81 as driven by the blank engaging lug 16—16'.

Blank feeding apparatus constructed in accordance with this invention may be associated with any type or form of blank conveyer and may be adjusted to feed blank runs of any desired blank length, width, or thickness. The apparatus operates to positively separate, withdraw and deposit successive blanks on the conveyer in uniformly spaced and registered relation to meet any spacing and registering conditions which subsequent blank treating operations may require.

While certain novel features of this invention have been disclosed herein and are pointed out in the claims, it will be understood that various omissions, substitutions and changes may be made by those skilled in the art without departing from the teachings of this invention.

What is claimed is:

1. A method of successively removing the endmost blank from a stack of blanks which includes, supporting the bottom edges of the blank stack on a supporting surface, releasably supporting the end edges of the endmost blank, applying a blank compressing and forwardly directed force against a horizontal edge of the endmost blank to thereby outbow the endmost blank between the top and bottom edges thereof, relatively flattening the midsecion of the endmost blank while leaving the bottom and top sections thereof outbowed to thereby positively separate the endmost blank from the next adjacent blank in the blank stack, suction gripping the flattened midsection of the endmost blank, and forcibly withdrawing the suction gripped endmost blank from the blank stack.

2. A method of successively removing the endmost blank from a stack of blanks which includes, supporting the bottom edges of the blank stack on a supporting surface, releasably supporting the end edges of the endmost blank, applying a blank compressing and forwardly directed force against the upper edge of the endmost blank to thereby outbow the endmost blank between the top and bottom edges thereof, relatively flattening the midsecion of the endmost blank while leaving the bottom and top sections thereof outbowed to thereby positively separate the endmost blank from the next adjacent blank in the blank stack, suction gripping the flattened midsection of the endmost blank, and forcibly withdrawing the suction gripped endmost blank from the blank stack.

3. The method of successively removing the endmost blank from a stack of blanks which includes, supporting the bottom edges of the blank stack on a forwardly inclined supporting surface, releasably supporting the end edges of the endmost blank to thereby releasably retain the endmost blank and the successive blanks of the stack in vertically extending forwardly inclined position with the upper edge of the endmost blank overhanging the bottom edge thereof, applying a blank compressing and forwardly directed force against the upper edge of the endmost blank to thereby outbow the endmost blank between the top and bottom edges thereof, relatively flattening the midsection of the endmost blank while leaving the bottom and top sections thereof outbowed to thereby positively separate the endmost blank from the next adjacent blank in the blank stack, suction gripping the flattened midsection of the endmost blank, and forcibly withdrawing the suction gripped endmost blank from the blank stack.

4. The method of successively removing the endmost blank from a stack of elongated flexible blanks which includes, supporting the bottom edges of the blank stack on a forwardly inclined supporting surface, releasably supporting the end edges of the endmost blank to thereby releasably retain the endmost blank and the successive blanks of the stack in vertically extending forwardly inclined position with the upper edge of the endmost blank overhanging the bottom edge thereof, applying a blank compressing and forwardly directed force against the bottom edge of the endmost blank to thereby outbow the endmost blank between the top and bottom edges thereof, relatively flattening the midsection of the endmost blank while leaving the bottom and top sections thereof outbowed to thereby positively separate the endmost blank from the next adjacent blank in the blank stack, suction gripping the flattened midsection of the endmost blank, and forcibly withdrawing the suction gripped endmost blank from the blank stack.

5. A method of successively removing the endmost blank from a stack of blanks which includes, supporting the bottom edges of the blank stack on a forwardly inclined supporting surface, releasably supporting the end edges of the endmost blank to thereby releasably retain the blank stack in vertically extending forwardly inclined position with the top edge of the endmost blank forwardly overhanging the bottom edge thereof, applying blank compressing and forwardly directed forces against the bottom and top edges of the endmost blank to thereby outbow the endmost blank between the top and bottom edges thereof, relatively flattening the midsecion of the endmost blank while leaving the bottom and top sections thereof outbowed to thereby positively separate the endmost blank from the next adjacent blank in the blank stack, suction gripping the flattened midsection of the endmost blank, and forcibly withdrawing the suction gripped endmost blank from the blank stack.

6. A method of successively removing the endmost blank from a stack of blanks which includes, supporting the bottom edges of the blank stack on a forwardly inclined supporting surface, releasably supporting the end edges of the endmost blank to thereby releasably retain the blank stack in vertically extending forwardly inclined position with the upper edge of the endmost blank forwardly overhanging the bottom edge thereof, applying a blank compressing and upwardly and forwardly directed force against the bottom edge of the endmost blank and substantially simultaneously applying a downwardly and forwardly directed force against the upper edge of the endmost blank to thereby outbow the endmost blank between the top and bottom edges thereof, relatively flattening the midsection of the endmost blank while leaving the bottom and top sections thereof outbowed to thereby positively separate the endmost blank from the next adjacent blank of the blank stack, suction gripping the flattened midsection of the endmost blank, and forcibly withdrawing the suction gripped endmost blank from the blank stack.

7. Apparatus for successively removing the endmost blank from a stack of blanks which includes, forwardly inclined slide members for slidably supporting the bottom edges of the blank stack, vertically extending and forwardly inclined abutment means designed to releasably engage the opposite end edges of the endmost blank and releasably retain the blank stack in vertically extending forwardly inclined position with the upper edge of the endmost blank forwardly overhanging the bottom edge thereof, rotatable means operative to engage a horizontal edge of the endmost blank and apply a blank compressing and forward force thereto to thereby outbow the midsection of the endmost blank sufficient to separate the midsection thereof from the next adjacent blank of the blank stack, swingably mounted suction elements designed to grip the midsection of the endmost blank, means for swinging said suction elements in one direction and into pressure engagement with the outbowed midsection of the endmost blank to thereby relatively flatten the midsection of the endmost blank while leaving the top and bottom sections thereof outbowed, means for applying suction to said suction elements to thereby suction grip the flattened midsection of the blank, means for thereafter swinging said suction elements in the opposite direction to thereby withdraw the suction gripped blank from the blank stack, and means for swinging said suction means in operating synchronism with said rotatable blank-edge engaging means.

8. Apparatus for successively removing the endmost blank from a stack of blanks which includes, forwardly inclined slide members slidably supporting the bottom edges of the blank stack, abutment means designed to releasably engage the opposite end edges of the endmost blank and releasably retain the blank stack in vertically extending forwardly inclined position with the upper edge of the endmost blank forwardly overhanging the bottom edge thereof, rotatable means operative to engage the upper edge of the endmost blank and apply a downward and forward force thereto to thereby outbow the midsection of the endmost blank sufficient to separate the midsection thereof from the next adjacent blank of the blank stack, swingably mounted suction elements designed to grip the midsection of the endmost blank, means for swinging said suction elements in one direction and into pressure engagement with the outbowed midsection of the endmost blank to thereby initially relatively flatten the midsection of the endmost blank to assure positive separation of the outbowed top and bottom sections of the endmost blank from the next adjacent blank, means for applying suction to said suction elements to thereby suction grip the flattened midsection of the endmost blank, and means for thereafter swinging said suction elements in the opposite direction to thereby withdraw the suction gripped blank from the blank stack.

9. Apparatus for successively removing the endmost blank from a stack of blanks which includes, forwardly inclined slide members slidably supporting the bottom edges of the blank stack, abutment means designed to releasably engage the opposite end edges of the endmost blank and releasably retain the blank stack in vertically extending forwardly inclined position with the upper edge of the endmost blank forwardly overhanging the bottom edge thereof, rotatable means operative to engage the bottom edge of the endmost blank and apply an upward and forward force thereto to thereby outbow the midsection of the endmost blank sufficient to separate the midsection thereof from the next adjacent blank of the blank stack, swingably mounted suction elements designed to grip the midsection of the endmost blank, means for swinging said suction elements in one direction and into pressure engagement with the outbowed midsection of the endmost blank to thereby initially relatively flatten the midsection of the endmost blank to assure positive separation of the outbowed top and bottom sections of the endmost blank from the next adjacent blank, means for applying suction to said suction elements to thereby suction grip the flattened midsection of the endmost blank, and means for thereafter swinging said suction elements in the opposite direction to thereby withdraw the suction gripped blank from the blank stack.

10. Apparatus for successively removing the endmost blank from a stack of blanks which includes, forwardly inclined slide elements for slidably supporting the bottom edges of the blank stack, abutment means designed to releasably engage the opposite end edges of the endmost blank and releasably retain the blank stack in vertically extending forwardly inclined position with the upper edge of the endmost blank forwardly overhanging the bottom edge thereof, spaced rotatable means operative to engage the upper and lower edges of the endmost blank and apply a forward flexing force thereto to thereby outbow the midsection of the endmost blank sufficient to separate the midsection thereof from the next adjacent blank of the blank stack, swingably mounted suction elements designed to grip the midsection of the endmost blank, means for swinging said suction elements in one direction and into pressure engagement with the outbowed midsection of the endmost blank to thereby initially relatively flatten the midsection of the endmost blank to assure positive separation of the outbowed top and bottom sections of the endmost blank from the next adjacent blank, means for applying suction to said suction elements to thereby suction grip the flattened midsection of the endmost blank, and means for thereafter swinging said suction elements in the opposite direction to thereby withdraw the suction gripped blank from the blank stack.

11. Apparatus for successively removing the endmost blank from a stack of elongated blanks including in combination, a stack holder, means for tiltably supporting said stack holder, said stack holder presenting a pair of transverse members, a pair of slide members supported by said transverse members and transversely adjustable thereon, each of said slide members having a bottom section for slidably supporting the bottom edges of the blank stack and vertical sections for aligning the end edges of the blanks in the stack and guiding the forward movement of the blank stack, an abutment roller at each end of the blank stack operative to releasably engage the adjacent end edge of the endmost blank and releasably retain the blank stack in supported position on said slide members, means for adjustably securing said abutment rollers to the adjacent forward ends of said slide members, a lower transversely extending picker shaft rotatably mounted adjacent the discharge end of the blank supporting sections of said slide members and in adjacent overlapping relation to the lower horizontal edge of the endmost blank, an upper transversely extending picker shaft rotatably mounted in adjacent overlapping relation to the upper horizontal edge of the endmost blank, means for rotating said picker shafts in opposite directions to thereby outbow the midsection of the endmost blank and separate the midsection thereof from the next adjacent blank in the blank stack, swingably mounted suction means designed to be swung in one direction into gripping contact with the outbowed section of the endmost blank and to be swung in the opposite direction to thereby withdraw the suction gripped endmost blank from abutment roller supported position, and means for swinging said suction means in synchronism with the rotation of said picker shafts.

12. Apparatus for successively removing the endmost blank from a stack of elongated blanks including in combination, a stack holder, means for tiltably supporting said stack holder, said stack holder presenting a pair of support plates, a pair of transverse members connecting said support plates, a pair of slide members supported by said transverse members and transversely adjustable thereon, each of said slide members having a bottom section for slidably supporting the bottom edges of the blank stack and a vertical section for aligning the end edges of the blanks in the stack and guiding the forward movement of the blank stack, intermediate slide rods between said slide members adjustably secured to said transverse members and designed to support the intermediate bottom edges of the blank stack, a pair of abutment rollers at each end of the blank stack operative to releasably engage the adjacent end edge of the endmost blank and releasably retain the blank stack in supported position on said slide members and slide rods, a pintle rod rotatably supporting each pair of abutment rollers, adjustable brackets elements for adjustably securing each of said pintle rods to the adjacent forward end of said slide members, a lower picker shaft rotatably mounted on said support plates directly adjacent the discharge end of the blank supporting sections of said slide members and in adjacent overlapping relation to the lower horizontal edge of the endmost blank, an upper picker shaft rotatably mounted on said support plates, means for adjusting said upper picker shaft to a position directly adjacent the upper horizontal edge of the endmost blank of the blank stack, means for rotating said picker shafts in opposite directions to thereby outbow the midsection of the endmost blank and separate the midsection thereof from the next adjacent blank in the blank stack, swingably mounted suction means designed to be swung in one direction into gripping contact with the outbowed section of the endmost blank and to be swung in the opposite direction to thereby withdraw the suction gripped endmost blank from abutment roller supported position, and means for swinging said suction means in synchronism with the rotation of said picker shafts.

13. In combination with apparatus for successively removing the endmost blank from a stack of elongated blanks, a stack holder, means for adjustably supporting said stack holder in tilted position, said stack holder presenting a pair of side wall support plates, a pair of transverse members connecting said support plates, a pair of slide members supported by said transverse members and transversely adjustable thereon, each of said slide members having a bottom section for supporting the bottom edges of the blank stack and a vertical section for aligning the end edges of the blanks in the stack and guiding the forward movement of the blank stack, intermediate slide rods between said slide members adjustably secured to said transverse support members and designed to support the intermediate bottom edges of the blank stack, a pair of abutment rollers at each end of the blank stack operative to releasably engage the adjacent end edge of the endmost blank and releasably retain the blank stack in supported position on said slide members and slide rods, a pintle rod rotatably supporting each pair of abutment rollers, adjustable bracket elements for adjustably securing each of said pintle rods to the forward end of the vertical section of the adjacent slide member, a lower picker shaft rotatably mounted on said support plates directly adjacent the discharge end of the blank supporting sections of said slide members and in adjacent overlapping relation to the lower horizontal edge of the endmost blank, an upper picker shaft rotatably mounted on said support plates, means for adjusting said upper picker shaft to a position directly adjacent the upper horizontal edge of the endmost blank of the blank stack, means for maintaining the upper horizontal edges of the stacked blanks in alignment, and means for rotating said picker shafts in opposite directions to thereby outbow the midsection of the endmost blank and separate the midsection thereof from the next adjacent blank in the blank stack.

14. Apparatus for separating, depositing and conveying successive blanks removed from a blank stack including in combination: a stack holder having an open end from which successive endmost blanks may be withdrawn, and abutment means designed to releasably engage the end edges of the endmost blank and releasably retain the blank stack in the stack holder; a blank conveyer beneath said stack holder; blank separating mechanism designed to grip the opposite side edges of the endmost blank to thereby outbow the midsection of successive endmost blanks sufficient to separate the midsection thereof from the next adjacent blank in the blank stack; blank depositing mechanism operative to grip the midsection of successive outbowed endmost blanks and deposit the same for transportation on such conveyer, said blank conveyer having a series of spaced lug elements designed to engage the rear edge of successive blanks deposited thereon and advance the same in the direction of movement of said conveyer; registering mechanism for uniformly spacing the deposited blanks for transportation on said conveyer, said registering mechanism including a pair of blank holding elements, and means for manipulating said elements to thereby hold the deposited blank until the rear edge thereof is engaged by the advancing lug elements of said conveyer and to thereupon release the blank for forward travel on said conveyer; and means for driving said conveyer, said blank separating mechanism, said blank depositing mechanism and said blank registering mechanism in operating synchronism.

15. Apparatus for separating, depositing and conveying successive blanks removed from a blank stack including in combination: a stack holder having an open end from which successive endmost blanks may be withdrawn, and abutment means designed to releasably engage the end edges of the endmost blank and releasably retain the same in the stack holder; a blank conveyer beneath said stack holder having spaced lug elements designed to engage the rear edge of a blank deposited thereon and advance the same in the direction of movement of said conveyer; blank separating mechanism including a pair of picker devices rotatably mounted in abutting relation to the opposite side edges of the endmost blank and operating to grip the opposite side edges of the endmost blank during rotation thereof, and means for rotating said picker devices in opposite directions to thereby outbow the midsection of the endmost blank sufficient to separate the midsection thereof from the next adjacent blank in the blank stack; blank depositing mechanism including a series of swingably mounted suction devices designed to be swung in one direction and into suction gripping contact with the outbowed section of the endmost blank and to be swung in the opposite direction to thereby withdraw the suction gripped endmost blank from its end supported position and deposit the same in position for transportation by said conveyer; registering mechanism including cooperating blank holding elements, and means for manipulating said elements to thereby hold the deposited blank in the position in which it was deposited until the rear edge thereof is engaged by the adjacent advancing blank engaging lugs of said conveyer and to thereupon release the blank for forward travel on said conveyer; and means for driving said conveyer, said blank separating mechanism, said blank depositing mechanism and said blank registering mechanism in operating synchronism.

16. Apparatus for separating, depositing and conveying successive blanks removed from a blank stack including in combination, a stack holder having an open end from which successive endmost blanks may be withdrawn, and abutment means designed to releasably engage the end edges of the endmost blank and releasably retain the same in the stack holder; a blank conveyer beneath said stack holder operative to transport successive blanks deposited thereon; separating mechanism designed to grip the opposite side edges of the endmost blank and outbow and separate the midsection thereof from the next adjacent blank in the blank stack; and blank depositing mechanism operative to grip the midsection of successive outbowed endmost blanks and deposit the same for transportation on said conveyer, said blank depositing mechanism including a series of tubular suction arms each having one end thereof affixed to a tubular rocker shaft and having a resilient suction cup mounted on the other end thereof, a drive shaft, means for rotating said drive shaft, a cam member affixed to said drive shaft, a pivoted rocker arm designed to be oscillated by said cam member, and means for adjustably connecting said rocker arm to said rocker shaft to thereby oscillate said suction arms to and from endmost blank gripping position and to and from blank depositing position during rotation of said drive shaft.

17. Apparatus for separating, depositing and conveying successive blanks removed from a blank stack including in combination, a stack holder having an open end from which successive endmost blanks may be withdrawn, and abutment means designed to releasably engage the end edges of the endmost blank and releasably retain the same in the stack holder; a blank conveyer beneath said stack holder operative to transport successive blanks deposited thereon; separating mechanism designed to grip the opposite side edges of the endmost blank and outbow and separate the midsection thereof from the next adjacent blank in the blank stack; and blank depositing mechanism operative to grip the midsection of sucessive outbowed endmost blanks and deposit the same for transportation on said conveyer, said blank depositing mechanism including a series of tubular suction arms each having one end theerof affixed to a tubular rocker shaft and having a resilient suction cup mounted on the other end thereof, a drive shaft, means for rotating said drive shaft, a cam member fixed to said drive shaft, a pivoted rocker arm designed to be oscillated by said cam member, means for connecting said rocker arm to said rocker shaft to thereby oscillate said suction arms to and from endmost blank gripping position and to and from blank depositing position during rotation of said drive shaft, an automatic control valve having a suction connection to said suction arms, and means operated by the rotation of said drive shaft for manipulating said control valve to control the suction supplied to said suction arms.

18. Apparatus for separating, depositing and conveying successive blanks removed from a blank stack including in combination; a stack holder having an open end from which successive endmost blanks may be withdrawn, abutment means designed to releasably engage the end edges of the endmost blank and releasably retain the same in the stack holder, a blank conveyer beneath said stack holder having a series of spaced lug elements designed to engage the rear edge of successive blanks deposited thereon and advance the same in the direction of movement of said conveyer, blank separating mechanism designed to grip the opposite side edges of the endmost blank to thereby outbow and separate the midsection thereof from the next adjacent blank in the blank stack, blank depositing mechanism operative to grip the midsection of successive outbowed endmost blanks and deposit the same for transportation on such conveyer, and registering mechanism for uniformly spacing the deposited blanks on said conveyer, said registering mechanism including a pair of blank holding elements, and means for manipulating said elements to thereby hold the deposited blank until the rear edge thereof is engaged by the advancing lug elements of said conveyer and to thereupon release the blank for forward travel on said conveyer.

References Cited in the file of this patent

UNITED STATES PATENTS

| | | |
|---|---|---|
| 1,218,034 | Young | Mar. 6, 1907 |
| 1,416,983 | Schoenwetter | May 23, 1922 |
| 1,916,723 | Ferrar | July 4, 1933 |